United States Patent
Tee (10) Patent No.: US 11,819,793 B2
(45) Date of Patent: Nov. 21, 2023

(54) PLEATED FILTER DESIGNS AND COMPONENTS THEREFOR FOR ELEVATED TEMPERATURE APPLICATION

(71) Applicant: Yit-Hong Tee, Lee's Summit, MO (US)

(72) Inventor: Yit-Hong Tee, Lee's Summit, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 531 days.

(21) Appl. No.: 16/996,172

(22) Filed: Aug. 18, 2020

(65) Prior Publication Data

US 2021/0069628 A1 Mar. 11, 2021

Related U.S. Application Data

(60) Provisional application No. 62/965,608, filed on Jan. 24, 2020, provisional application No. 62/897,583, filed on Sep. 9, 2019.

(51) Int. Cl.
*B01D 46/24* (2006.01)
*B01D 29/11* (2006.01)
*B01D 29/23* (2006.01)
*B01D 46/52* (2006.01)
*B01D 46/00* (2022.01)

(52) U.S. Cl.
CPC ........ *B01D 46/2411* (2013.01); *B01D 29/111* (2013.01); *B01D 29/232* (2013.01); *B01D 46/0001* (2013.01); *B01D 46/523* (2013.01)

(58) Field of Classification Search
CPC ............ B01D 46/0001; B01D 46/2411; B01D 46/523; B01D 39/163; B01D 2239/065; B01D 2239/0654; B01D 29/111; B01D 29/232
See application file for complete search history.

(56) References Cited

U.S. PATENT DOCUMENTS

| | | |
|---|---|---|
| 6,008,146 A | 12/1999 | Stark |
| 6,110,249 A | 8/2000 | Medcalf et al. |
| 6,309,438 B1 | 10/2001 | Kanno et al. |
| 6,734,122 B1 | 5/2004 | Hunter |
| 6,752,847 B2 | 6/2004 | Smithies |
| 6,872,431 B2 | 3/2005 | Kahlbaugh et al. |
| 7,008,465 B2 | 3/2006 | Graham et al. |
| 8,282,713 B2 | 10/2012 | Smithies et al. |
| 8,728,401 B2 | 5/2014 | Parent et al. |
| 2020/0054975 A1* | 2/2020 | Belmont ............... D21H 11/18 |

OTHER PUBLICATIONS

Sefar BDH; X-800 High Temperature Pleated Element brochure; Jan. 17, 2017.
Parker Hannifin Corporation Industrial Gas Filtration and Generation Division; BHA Pleated Filter brochure; Jan. 4, 2018.

* cited by examiner

*Primary Examiner* — Robert Clemente
(74) *Attorney, Agent, or Firm* — Reinhart Boerner Van Deuren P.C.

(57) ABSTRACT

A filter includes a pleated filter element having a fibrous support layer and a filtration layer bonded to the fibrous support layer. The fibrous support layer and the filtration layer are both in pleated form to provide a plurality of pleats. A cured stiffening agent is applied to the fibrous support layer, and the pleated form is maintained. The fibrous support layer is bonded to the filtration layer by other than the cured stiffening agent.

25 Claims, 11 Drawing Sheets

PLEATED FILTER DESIGNS AND COMPONENTS THEREFOR FOR ELEVATED TEMPERATURE APPLICATION

CROSS-REFERENCE TO RELATED PATENT APPLICATIONS

This patent application claims the benefit of U.S. Provisional Patent Application No. 62/965,608, filed Jan. 24, 2020 and claims the benefit of U.S. Provisional Patent Application No. 62/897,583, filed Sep. 9, 2019, the entire teachings and disclosure of each of these provisional applications are incorporated herein by reference thereto.

FIELD OF THE INVENTION

This invention generally relates to air filters, and more particularly to pleated filter elements that may be used in cartridges for pulse jet baghouse applications, including high temperature applications.

BACKGROUND OF THE INVENTION

Air filter products may include a laminate of a filtration layer such as expanded polytetrafluoroethylene (also referred to herein as EPTFE) and a reinforcing layer, such as shown in Kanno, U.S. Pat. No. 6,309,438. Such laminates may be formed using an intermediary adhesive agent such as hot melt to bond the polymer fibrous layer to the reinforcing layer, as may be described in Kanno. In another example of Stark, U.S. Pat. No. 6,008,146, stiffening agents have been added using immersion techniques and then cured to strengthen a composite material. Other examples of air filter products are shown in U.S. Pat. Nos. 6,734,122, 6,752,847, and 8,728,401. As will be appreciated by the present disclosure below, improvements over the state of the art are provided for pleated filter elements that may be used in high temperature applications.

BRIEF SUMMARY OF THE INVENTION

Air filter elements according to the various embodiments disclosed herein may be used in pulse jet baghouse applications. Embodiments herein may be used in high temperature particulate filtration environments such as cement kilns or other kiln applications, and subjected to periodic back-pulsing.

One inventive aspect is directed toward a filter including a fibrous support layer and a filtration layer bonded to the fibrous support layer. The fibrous support layer and the filtration layer are both in pleated form to provide a plurality of pleats. A cured stiffening agent is applied to the fibrous support layer, with the pleated form being maintained. The fibrous support layer can be bonded to the filtration layer by other than the cured stiffening agent.

Another inventive aspect is directed toward a filter including a pleated filter element. The pleated filter element includes a fibrous support layer, and a filtration layer along a first side of the fibrous support layer. The fibrous support layer and the filtration layer are in a pleated form to provide a plurality of pleats. A surface coating of a stiffening agent is provided along a second side of the fibrous support layer opposite the first side.

Yet another inventive aspect and more particular embodiment is directed toward a pleated filter element, including: (a) a laminate of a woven fiberglass layer and a layer of EPTFE applied to one side of the fiberglass layer, and (b) a surface coating of a phenolic resin applied to the other side of the fiberglass layer to provide stiffness after pleating.

Various features may be employed with these aspects above or other aspects below, either alone or in combination with each other as summarized below.

The fibrous support layer may include fibers of a material able to withstand an operating temperature of at least 500° Fahrenheit. Similarly, the filtration layer can be of a material able to withstand an operating temperature of at least 500° Fahrenheit.

The fibrous support layer may include one or more of the following characteristics (and preferably all characteristics in combination): (a) a basis weight of between 8 ounces/square yard to 25 ounces/square yard, (b) fibers having an average width of at least 1.0 micron (more preferably between 3.0 and 50.0 micron, and most preferably between 5.0 and 25.0 micron), and/or (c) a caliper thickness of between 0.127 mm and 1.27 mm (more preferably between 0.250 mm and 1.0 mm, and most preferably between 0.254 mm and 0.76 mm).

The filtration layer may include at least one of (a) an expanded membrane comprising nodes and fibrils, wherein the fibrils have an average width not greater than 1 micron, and (b) nanofibers having an average width not greater than 1 micron. For example, the expanded membrane may be an expanded thin film polymer such as EPTFE. For example, a nanofiber layer may be a deposited layer of electrospun or force spun fibers (or possibly meltblown fibers).

The filtration layer may include one or more of the following characteristics (and preferably all characteristics in combination): (a) an initial filtration efficiency of at least 95.0% for 3.0 microns as measured by ASTM D6830-02/VDI 3962 (more preferably at least 95.0% for 1.0 micron, and most preferably at least 95.0% for 0.3 micron), and most preferably filtration efficiencies greater than 99.99% for either 3.0 micron, 1.0 micron or 0.3 micron); (b) a caliper thickness of between 0.005 mm to 0.015 mm; and/or (c) an air flow permeability of between 3.5 cfm at 125 Pa and 10 cfm at 125 Pa measured by ASTM D737 (the air flow permeability being more preferably between 4 cfm at 125 Pa and 10 cfm at 125 Pa, and most preferably between 5cfm at 125 Pa and 10 cfm at 125 Pa); and/or (d) a basis weight of less than 0.5 ounce/square yard (more typically between 0.2 ounce/square yard and 0.02 ounce/square yard; and most preferably between 0.10 ounce/square yard and 0.065 ounce/square yard).

The filtration layer may be bonded to the fibrous support layer by controlled pressurized thermal mechanical interfacial layer bonding. This may avoid the need for interlayer adhesives.

The cured stiffening agent may provide added basis weight to the composite filter media of between 0.88 ounce/square yard to 4.4 ounces/square yard (more preferably between 1.1 ounce/square yard and 3.3 oz/square yard, and most preferably between 1.32 ounce/square yard and 2.2 ounce/square yard).

The cured stiffening agent may include at least one of a phenolic resin, a modified epoxy, and a thermoset polymer.

The cured stiffening agent may include a surface coating applied to a first side of the fibrous support layer. The filtration layer can be applied to a second side opposite the first side of the fibrous support layer.

The cured stiffening agent may penetrate a partial depth of the fibrous support layer at an average depth of between 5% to 80% of a thickness of the fibrous support layer (more preferably between 25% and 60%). The cured stiffening agent may maintain pleat shape of the pleats without any pleated metal support.

Preferably, the fibrous support layer includes a stiffened region having the cured stiffening agent, and a free region that is free of the cured stiffening agent. The free region is interposed between the stiffened region and the filtration layer.

The fibrous support layer may include at least one of a woven fiberglass layer and/or a non-woven fiberglass layer, a woven PTFE felt, and a polymer needle felt including a polymer that is able to withstand an operating temperature of at least 500° Fahrenheit. The filtration layer may include at least one of an EPTFE membrane and a nanofiber layer.

Preferably, the fibrous support layer includes a woven fiberglass layer, and the filtration layer is an EPTFE membrane. Also preferably, the cured stiffening agent may include a phenolic resin.

Preferably, the pleated filter element is integrated into a back-pulsed filter cartridge. In such a cartridge, the pleated form of the filter element defines a tubular ring that further defines a central cavity with the fibrous support layer positioned along the central cavity. The filtration layer is positioned on a radially outboard surface thereof. A support core supports an inner periphery of the tubular ring along the central cavity. An open end cap is attached to a first end of the tubular ring, and a closed end cap is attached to a second end of the tubular ring. At least one support strap is positioned in spaced locations between the closed end cap and the open end cap in surrounding supporting relation to the tubular ring. The support strap provides restraint to support and prevent bursting of the pleats when backpulsing is applied.

A feature is directed toward a method of using such a filter. The pleated filter element is installed into a tube sheet of a reverse pulse filter house. The pleated filter element is operated continuously over at least several hours at an elevated temperature of at least 500° Fahrenheit to remove particulates from an air stream passing through the pleated filter element. The pleated filter element is periodically reverse pulsed to dislodge filter cake collected on the pleated filter element.

Another inventive aspect is directed toward a method for making a pleated filter element. A filter media is provided and includes a fibrous support layer bonded to a filtration layer. A curable stiffening agent is applied without immersing the filter media to a side of the fibrous support, to create a surface layer of the curable stiffening agent on the fibrous support layer. The filter media is pleated to form a plurality of pleats. The stiffening agent is cured to retain the filter media in a form of the plurality of pleats.

For example, a solution of the curable stiffening agent can be applied by a single side applicator to the fibrous support layer. An example is a transfer roller that has one location that picks up the curable stiffening agent solution and another spaced location that applies the solution to the fibrous support layer on only one side (e.g. on the side opposite the filtration layer if the filtration layer is already bonded to the fibrous support layer).

Preferably, the step of curing includes a first stage of curing before pleating to partially cure and stiffen the filter media, and a second stage of curing after pleating to set the pleats.

The first stage of curing may include heating the filter media to a temperature of between 200° and 400° Fahrenheit for a duration of between 1.0 minutes to 5.0 minutes. The second stage of curing includes heating the filter media to a temperature of between 200° and 400° Fahrenheit for a duration of between 3.0 minutes to 4.0 minutes.

The temperature of the second stage of curing (after pleating) may be greater than the first stage of curing, for example by at least 20° Fahrenheit.

Preferably, the curable stiffening agent is applied to the fibrous support layer after the fibrous support layer is bonded to the filtration layer, and applied only on a side which is opposite an opposing side to which the filtration layer is bonded.

The filtration layer may be bonded to the fibrous support layer by controlled pressurized thermal mechanical interfacial layer bonding. The curable stiffening agent forms no part of any bonding between the filtration layer and the fibrous support layer. This bonding is conducted prior to application of the curable stiffening agent.

Preferably, the step of applying the curable stiffening agent includes surface coating using a transfer roll that contacts only one side of the fibrous support layer.

The method may include the following further steps: the pleated filter media is oriented circumferentially around a longitudinal axis. The fibrous support layer faces inwards to form a first end and a second end. A core, having a plurality of perforations, is placed circumferentially interior to the pleated filter media. The first end is capped with a top end pan, and the second end is capped with a bottom end pan. At least one support strap is placed circumferentially exterior to the pleated filter media spaced between the top end pan and the bottom end pan to provide restraint for the pleated filter media for backpulse support.

Preferably, the fibrous support layer includes at least one of a woven fiberglass layer and/or a non-woven fiberglass layer, a woven PTFE felt, and a polymer needle felt including a polymer that is able to withstand an operating temperature of at least 500° Fahrenheit. The filtration layer includes at least one of an EPTFE membrane and a nanofiber layer. The curable stiffening agent includes at least one of a phenolic resin, a modified epoxy, and a thermoset polymer.

Additionally, if desired, a metal screen (e.g. such as expanded metal or other wire metal mesh) may be copleated with the fibrous support layer and filtration layer to provide addition support to maintain pleat shape. For example, metal screen can be laid upon the fibrous support layer and then processed through the pleater. In an embodiment the metal screen is in contact with the outer external side of the fibrous support layer that has the curable stiffening agent applied thereto. The fibrous support layer and the metal screen can provide for the downstream outlet side of the overall pleated composite while the filtration layer can provide for the upstream inlet side.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
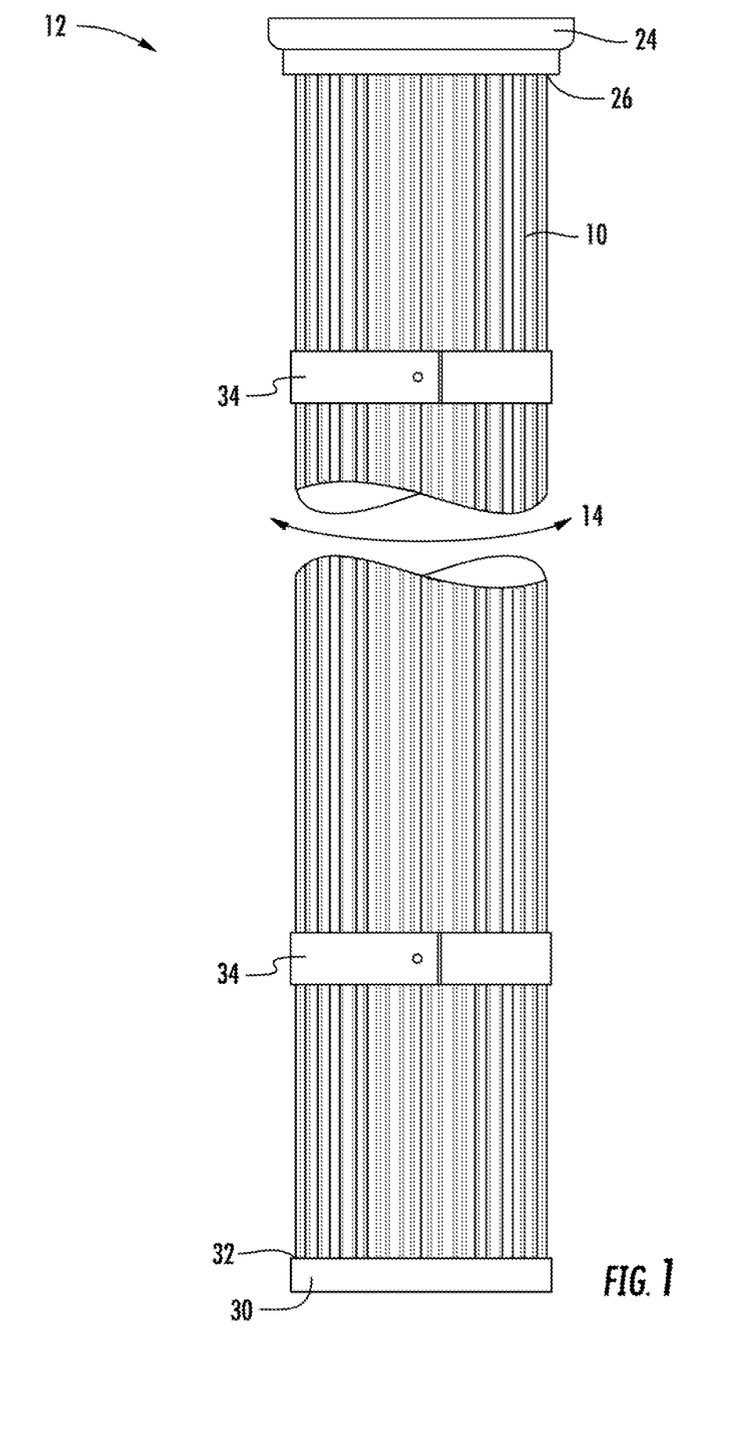
FIG. 1 is a partial side view of a pleated filter element incorporated into a filter cartridge, according to a first illustrated embodiment of the invention.
Figure 2:
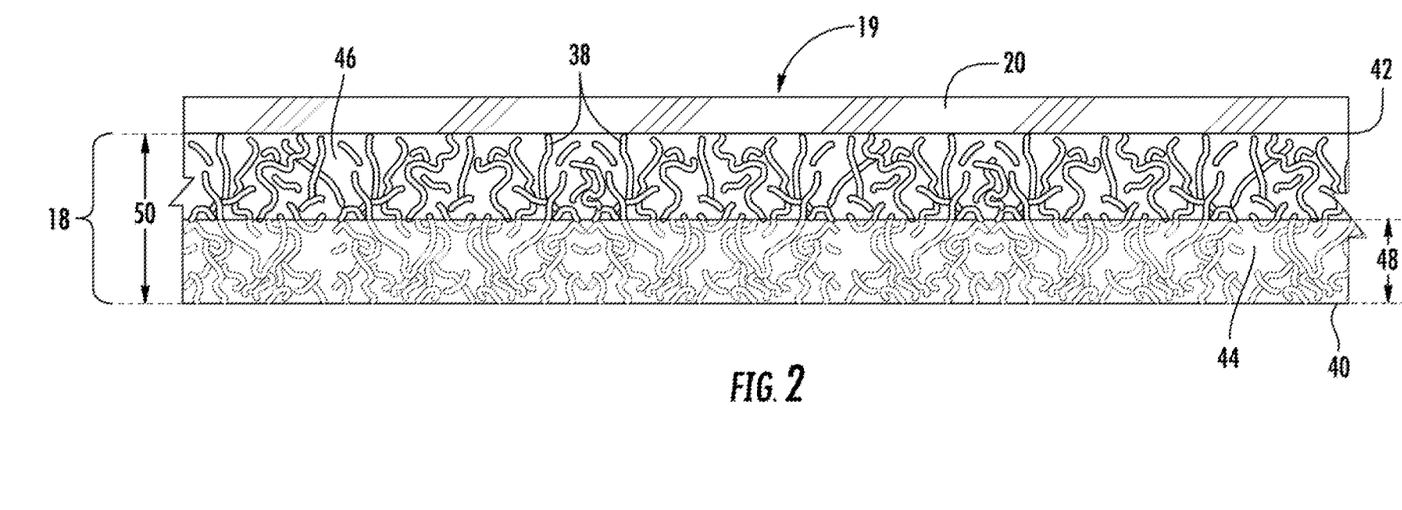
FIG. 2 is a partly schematic side view of a filter media composite that is used in the pleated filter element of FIG. 1.
Figure 3:
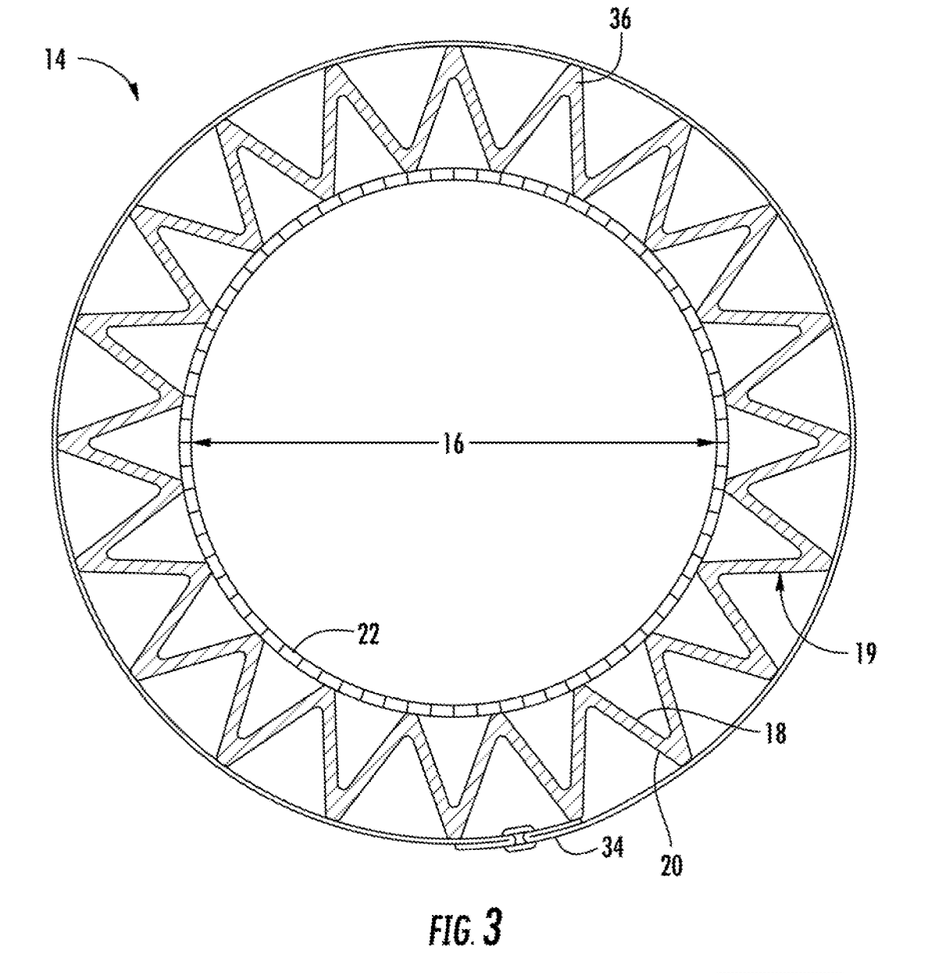
FIG. 3 is a horizontal cross-sectional view of the pleated filter element of FIG. 1.

Turning to FIGS. 1-3, a filter is illustrated as a pleated filter element 10 integrated into a filter cartridge 12 in accordance with an embodiment of the present invention. As such, the pleated filter element 10 has a pleated form provided in a tubular ring 14 which in turn defines a central cavity 16 (FIG. 3) for clean filtered air.

The pleated filter element 10 is formed from a filter media composite 19 (also referred to as a composite or laminated composite), as shown in FIG. 2, to include a fibrous support layer 18 and a filtration layer 20 bonded to the fibrous support layer 18. When arranged in the filter cartridge 12 of FIG. 1, the fibrous support layer 18 is positioned along the central cavity 16 and faces radially inward, as depicted in FIG. 3. The filtration layer 20 is positioned on a radially outboard surface of the fibrous support layer 18 for first inception of incoming unfiltered air flow.

Figure 4:
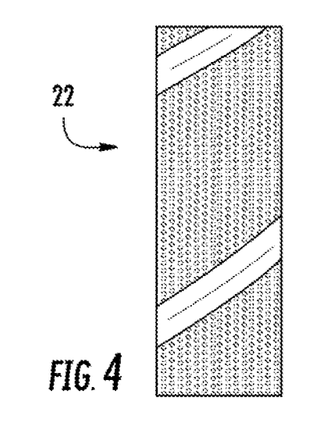
FIG. 4 is a side view of a support core that is used in the pleated filter element of FIG. 1.

To provide additional support for the filter media composite 19 when incorporated into the filter cartridge 12, a support core 22 may be used as shown in FIG. 3. The support core 22 is arranged to contact and support the fibrous support layer 18. The support core 22 can be a metal perforated cylindrical tube, as illustrated in FIG. 4. The support core 22 supports an inner periphery of the tubular ring 14 along the central cavity 16. In particular, the support core 22 is arranged to contact the inner facing pleat tips.

Figure 5A:
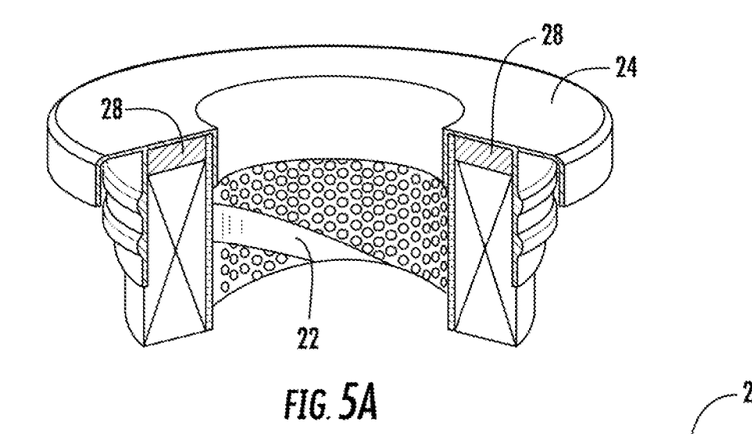
FIG. 5A is a perspective cross-sectional view of an example of an open end cap and support core that may be used for the pleated filter element of FIG. 1.

As first shown in FIG. 1, and more detailed in FIG. 5A, an open end cap 24 is attached to a first end 26 of the tubular ring 14. For example, the open end cap 24 can include an annular metal pan with a central opening and that has an annular potting well with potting adhesive material that bonds and seals a top end of the filter element 10 to the open end cap 24 to prevent unfiltered bypass therebetween.

Figure 5B:
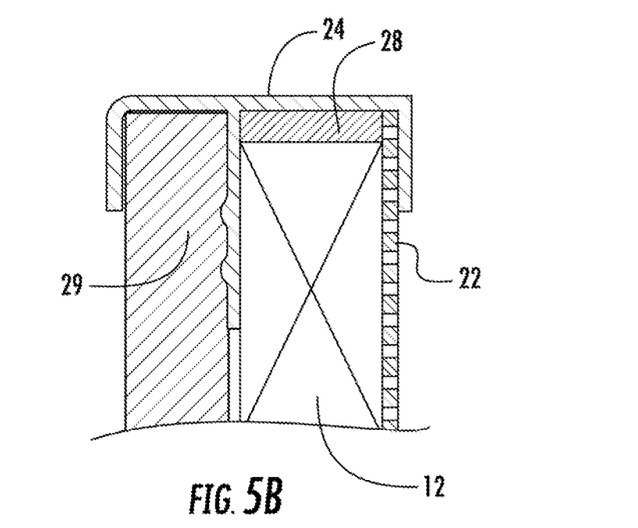
FIG. 5B is a schematic cross-section similar to FIG. 5A of the open end cap, but schematically indicating how the open end cap engages with a felt line projection on a modified tube sheet for sealing to prevent unfiltered airflow.

The open end cap 24 may include a seal structure 28 arranged around the first end 26 of the tubular ring 14, which may take the form of annular ribs that can engage an annular projection along the tube sheet (shown schematically in FIG. 5B). The tube sheet projection may include a stitched-and-felted circular metal snap band 29 with a filter metal top that fits the metal snap band. The stitched-and-felted circular metal snap band 29 can first be inserted into the tube sheet hole, followed by inserting the filter vertically, and pushing down the metal top of the filter to the metal snap band to seal the filter, thereby preventing bypass (see e.g. FIG. 5B and FIGS. 9-11, showing the filter installed in a tube sheet). However, it will be appreciated that any seal useable in filter cartridges can be employed, including annular radial sealing gaskets and annular axial sealing gaskets that can seal against the tube sheet when in use, depending upon tube sheet or filter house configuration.

Figure 6:
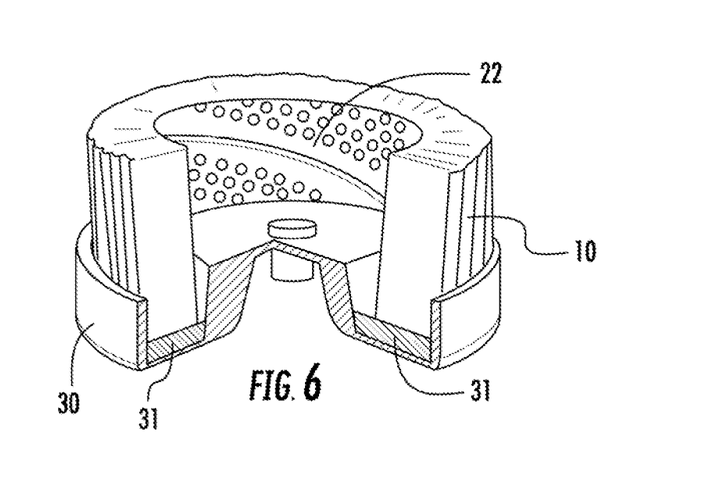
FIG. 6 is a perspective view of a closed end cap, a pleated filter element, and a support core, that may be used for the pleated filter element of FIG. 1.

As first shown in FIG. 1, and more detailed in FIG. 6, a closed end cap 30 is attached to a second end 32 of the tubular ring 14. The closed end cap 30 may include a metal bottom pan that holds a material 31, such as potting adhesive material, as a sealant to the second end 32 of the tubular ring 14 to prevent unfiltered bypass at the second end 32.

Furthermore, at least one support strap 34 (FIG. 1) can be positioned in spaced locations between the closed end cap 30 and the open end cap 24 in surrounding supporting relation to the tubular ring 14. The support straps 34 provide restraint to support and prevent bursting of a plurality of pleats 36 when backpulsing is applied.

The support straps 34 are arranged to contact the pleat tips that face radially outward and can contact the filtration layer. For example, metal bands suitable for high temperature applications may be used as a support strap 34.

Figure 7:
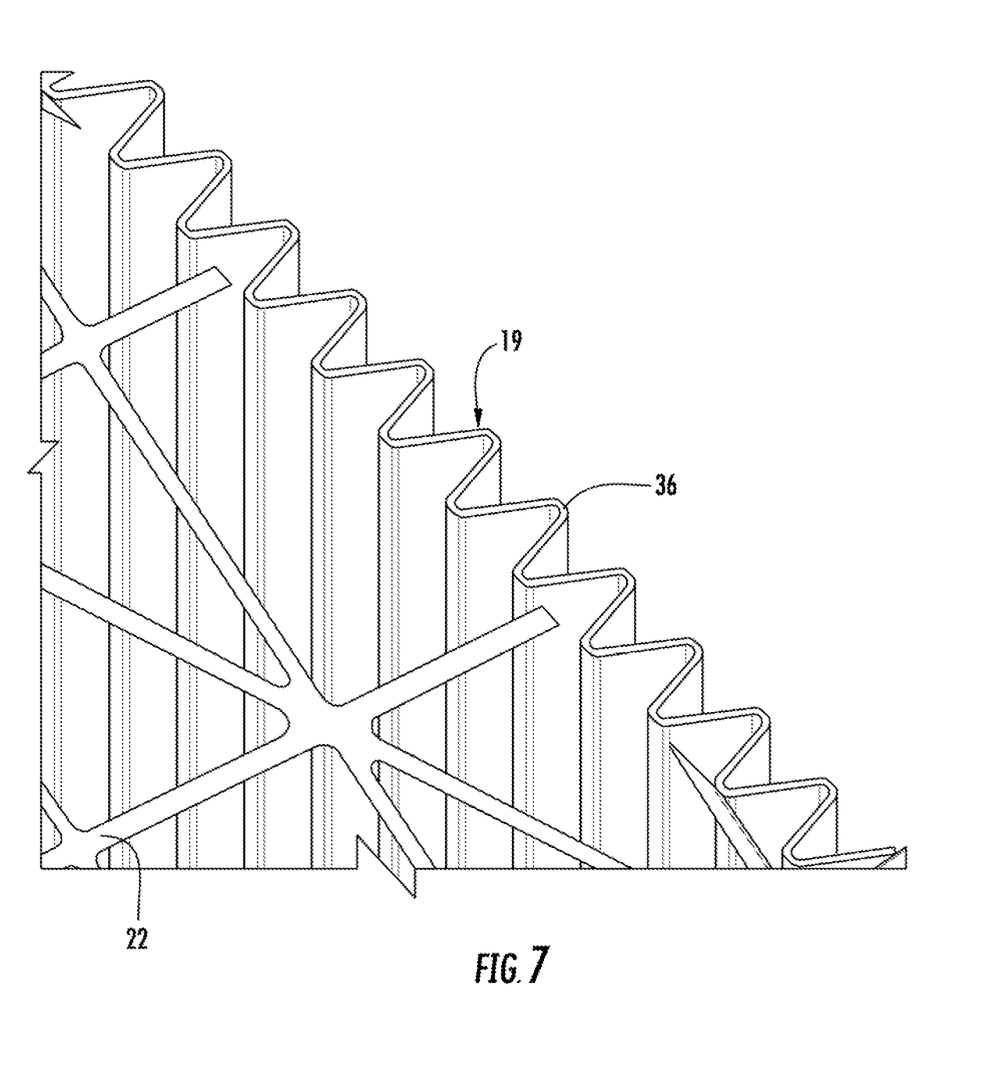
FIG. 7 is an enlarged perspective view of the pleated filter media composite used in the pleated filter cartridge of FIG. 1, illustrating a plurality of pleats for the pleated filter element.

The fibrous support layer 18 and the filtration layer 20 are both in pleated form to provide the plurality of pleats 36, best detailed in FIG. 7. A cured stiffening agent (e.g. see uncured agent 56 being applied in FIG. 8A, and the cured agent as schematically shown in FIG. 2 coating some of the fibers 38 of the fibrous layer 18) maintains the fibrous support layer 18 in the pleated form. The cured stiffening agent forms a thin film on the fibers 38 (e.g. fiberglass fibers) of the fibrous support layer 18 so that porosity or permeability is maintained and still largely defined for the overall filter media composite 19 by the filtration layer 20, which has much smaller and tighter openings than the stiffened fibrous support layer 18, even with the cured stiffening agent added.

Preferably, the fibrous support layer 18 is bonded to the filtration layer 20 by other than the cured stiffening agent. In this manner the filtration layer 20 may not be blocked off by the cured stiffening agent, and the filtration efficiency and permeability of the filter media composite 19 can be maintained. For example, and preferably in the case of EPTFE and a fiberglass support, controlled pressurized thermal mechanical interfacial layer bonding may be used without adhesives. In alternative embodiments, adhesive might be used, but those should be different than the stiffening agent resin.

As illustrated in FIG. 2, the fibrous support layer 18 provides support for the filtration layer 20. The fibrous support layer 18 has much larger fibers 38 and is thicker and more permeable than the filtration layer 20, even with the stiffening agent resin applied.

For example, the fibrous support layer 18 for backpulsed, high temperature applications can include at least one of (i) a woven fiberglass layer and/or a non-woven fiberglass layer, (ii) a woven PTFE felt, and (iii) a polymer needle felt including a polymer able to withstand an operating temperature of at least 500° Fahrenheit. Preferably for high temperature backpulsed applications, the fibrous support layer 18 for high temperature applications may be woven fiberglass, which provides a regular and strong support structure.

The fibrous support layer 18 preferably includes fibers 38 of a material able to withstand an operating temperature of at least 500° Fahrenheit.

The fibrous support layer 18 also preferably has a basis weight of between 8 ounces/square yard to 25 ounces/square yard.

The fibers 38 have an average width of at least 1.0 micron, more preferably between 3.0 microns to 50.0 microns, and most preferably between 5.0 microns to 25.0 microns.

The fibrous support layer 18 preferably has a caliper thickness of between 0.127 mm to 1.27 mm, more preferably between 0.250 mm to 1.016 mm, and most preferably between 0.254 mm to 0.76 mm.

Further in the illustrated embodiment, the filtration layer 20 is bonded to the fibrous support layer 18 by controlled pressurized thermal mechanical interfacial layer bonding.

Similar to the fibrous support layer 18, the filtration layer 20 is preferably of a material able to withstand an operating temperature of at least 500° Fahrenheit.

By way of example, the filtration layer 20 can include at least one of (a) an expanded membrane comprising nodes and fibrils (not shown), wherein the fibrils have an average width not greater than 1 micron, and (b) nanofibers (not shown) having an average width not greater than 1 micron.

Preferably, the filtration layer 20 has an initial filtration efficiency of at least 95.0% for a particle size of 3.0 microns as measured by ASTM D6830-03/VDI 3962, more preferably at least 95.0% for a particle size of 1.0 micron, and most preferably at least 95.0% for a particle size of 0.3 micron (non-limiting examples of such test dust particles include Drikalite®, Calwhite®, or Atomite®). Most typically, the filtration layer 20 will have filtration efficiencies greater than 99.99% for either 3.0 micron, 1.0 micron or 0.3 micron, as measured by ASTM D6830-03/VDI 3962.

The filtration layer 20 also preferably has an air flow permeability of between 3.5 cfm to 10 cfm at 125 Pa as measured by ASTM D737, more preferably between 4 cfm to 8 cfm at 125 Pa, and most preferably between 5 cfm to 7 cfm at 125 Pa.

As a specific example, the filtration layer 20 includes at least one of an EPTFE membrane and a nanofiber layer.

EPTFE is and may be defined as a fluoropolymer membrane with micropores that may be formed in a thin film that is stretched and expanded to form a porous structure.

Alternatively, nanofiber layers may be used with methods to produce a nanofiber layer include electrospinning, meltblowing, force spinning, and electroblowing. Such alternative methods are detailed in WO2009067365, WO2012109240, and WO2012109251.

Preferably, the filtration layer is in the form of an expanded film membrane that has the permeability, filtration efficiency and/or other filtration layer characteristics described herein.

Preferably, for a membrane such as EPTFE, the filtration layer 20 preferably has a caliper thickness of between 0.005 mm to 0.015 mm.

One potential issue with fiberglass is the potential inability to retain shape or memory. With the filtration layer 20 having a thinner and less robust structure, the present embodiment incorporates a resin as a coating on the fibers 38 of the fiberglass as a means to provide rigidity and stiffness and thereby also to retain shape memory, which is advantageous when in pleated form. In the illustrated embodiment, the cured stiffening agent is provided by a cured surface coating (e.g. at 44 in FIG. 2), which has been applied to a first side 40 of the fibrous support layer 18 that is then cured. As illustrated, the filtration layer 20 is along the second side 42 opposite the first side 40 of the fibrous support layer 18.

The filtration layer 20 contains pores that allow air flow from an external environment through the pleated filter element 10, but that trap particulates via surface filtration. The pores are preferably not obstructed with the cured stiffening agent. As such, the fibrous support layer 18 of the illustrated embodiment includes a stiffened region 44 and a free region 46 (FIG. 2). The stiffened region 44 includes the cured stiffening agent coating fibers 38 of the fibrous support layer 18. The fibers 38 in the stiffened region 44 may be fully or partially coated with the cured stiffening agent. The free region 46 is free of the cured stiffening agent and as shown schematically, the fibers 38 in the free region 46 are uncoated and free of the cured stiffening agent.

The free region 46 is interposed between the stiffened region 44 and the filtration layer 20. By way of example, the cured stiffening agent penetrates a partial depth 48 of the fibrous support layer 18 at an average depth of between 5% to 80% of a thickness 50 of the fibrous support layer 18. Such a partial depth 48 of penetration and resultant free region 46 allow the cured stiffening agent to provide further support to the fibrous support layer 18 while not obstructing the pores or filtration capability of the filtration layer 20.

Figure 8A:
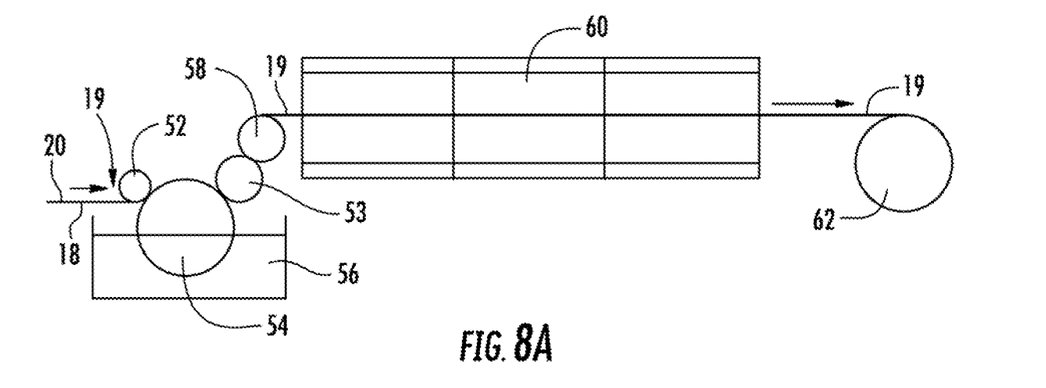
FIG. 8A is a schematic illustration of a roller applicator and oven cure station apparatus to provide a process for applying a surface coating to a fibrous support structure of the filter media composite for the pleated filter element.

Application of the surface coating of a solution of stiffening agent can be done, for instance, by a rolling transfer process, detailed in FIG. 8A. The fibrous support layer 18 comes into contact with contact maintenance rollers 52, 53 that serve to keep a pick-up and transfer roller 54 in contact with an outer surface of the filter media composite 19 to transfer a solution of stiffening agent to one side thereof, and as illustrated, only one side. The pick-up and transfer roller 54 carries the surface coating of the solution of stiffening agent from a reservoir 56 and applies a surface coating of the solution of stiffening agent to the first side 40 of the fibrous support layer 18.

Preferably, the filter media composite 19, including both the fibrous support layer 18 and the filtration layer 20, is processed through the pick-up and transfer roller 54, and then through the initial oven 60 of FIG. 8A for curing.

Accordingly, the fibrous support layer 18 may be arranged along a bottom side with the filtration layer 20 above so that the fibrous support layer 18 has a surface coating of the solution of stiffening agent applied thereto, while the filtration layer 20 is not surface coated. However, it may be sufficient in an alternative embodiment to apply the surface coating only to the fibrous support layer 18 along one side before lamination to the filtration layer 20.

Once passing the pick-up and transfer roller 54, the filter media composite 19 may be repositioned with a guide roller 58 that may also nip or integrate the surface coating further into the fibrous support layer 18, and optionally excess surface coating may drip back into the reservoir 56. The fibrous support layer 18 can then enter a heating chamber 60 such as may be provided by an oven, which may be a three-zone heating chamber, for initial stages of curing that partially cure the coating to provide sufficient stiffness to retain shape when pleating. Subsequently, the fibrous support layer 18 is transferred to a re-winding roller 62 (or may be directly fed to a pleater and subsequent cure such as in FIG. 8B).

At this stage, pleating is not yet conducted. Pleating of the fibrous support layer 18 occurs after, which is detailed in FIG. 8B and discussed further later below.

Returning to FIG. 8A, as an example, the cured stiffening agent that is applied includes at least one of (i) a phenolic resin, (ii) a modified epoxy, and (iii) a thermoset polymer. Preferably the cured stiffening agent is a phenolic resin.

The cured stiffening agent can be prepared from a resin solution containing a ratio between 18.5% to 22.5% solids to solvent. The solvent may include, for instance, water and methanol. This resin solution is what is contained in the reservoir 56 and applied via the pick-up and transfer roller 54 to the fibrous support layer 18 before curing. Further downstream processing will evaporate the water and methanol to leave the resin as a coating on the fibers 38 of the fibrous support layer 18.

The solution of stiffening agent is preferably applied in an amount sufficient to provide the fibrous support layer 18 with a final a basis weight (once the water and methanol are fully evaporated) of between 0.88 ounce/square yard to 4.4 ounces/square yard, more preferably between 1.1 ounce/square yard to 3.3 ounces/square yard, and most preferably between 1.32 ounce/square yard to 2.2 ounces/square yard. To be clear, these amounts are for the stiffened region 44 only, as the fibrous support layer 18 may range between 8 and 25 ounces/square yard.

Once the solution of stiffening agent is applied, a first stage of curing is undertaken (shown as the heating chamber 60 of FIG. 8A) before pleating to at least partially cure and stiffen the filter media composite 19. The amount of cure via the first stage in heat chamber 60 is sufficient to retain the pleat shape. Although a complete cure may be possible at this stage, a partial cure is more advantageous to allow for additional pliability for pleating.

Figure 8B:
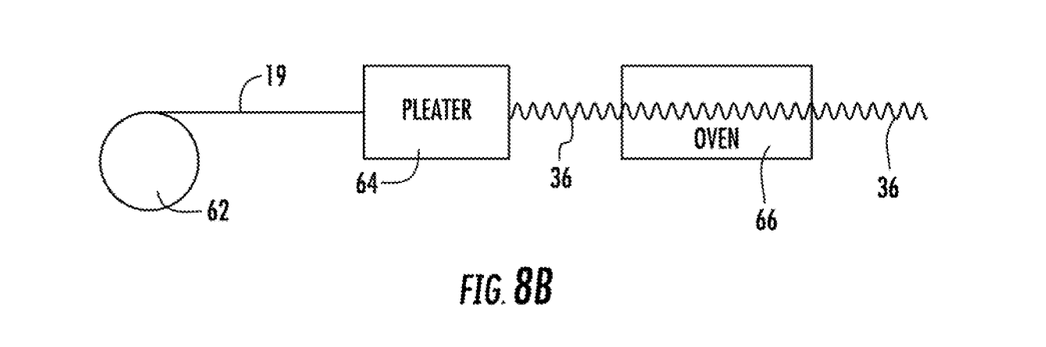
FIG. 8B is a schematic illustration of a pleating and further cure station apparatus that provides a pleating process for pleating the filter media composite.

Turning next to FIG. 8B, the partially cured and partially stiffened filter media composite 19 (e.g. that can be stored on a filter media roll 62) is then ready to be processed by a pleater 64 that creates pleats 36 into the filter media composite 19. The partially cured stiffening agent is able to retain shape and memory of the pleats 36 at this stage. Thereafter, the partially cured filter media composite 19 is subjected to a further curing via oven 66 that further cures and stiffens the filter media composite 19 and further sets the pleats 36.

The cured stiffening agent, such as a phenolic resin (or other options mentioned above), can maintain pleat shape of the pleats 36 without any pleated metal support and/or other co-pleated support. However, as shown in later embodiments of FIGS. 12-14, metal support such as via metal mesh may be also used in alternative embodiments, however, less support is needed with cured stiffening agent.

Referring to the figures as above, a method for making a pleated filter element 10 may therefore include providing a filter media composite 19 including a fibrous support layer 18 bonded to a filtration layer 20. The filtration layer 20 can be bonded to the fibrous support layer 18 by controlled pressurized thermal mechanical interfacial layer bonding and/or other form of lamination. For high temperature applications, the fibrous support layer 18 can include at least one of the following: a woven fiberglass layer and/or a non-woven fiberglass layer, a woven PTFE felt, and a polymer needle felt (that is able to withstand an operating temperature of at least 500° Fahrenheit). By way of further example, the filtration layer 20 includes at least one of an EPTFE membrane and a nanofiber layer (e.g. of high temperature resistant fibers).

As illustrated in FIG. 8A, a curable stiffening agent can be applied without immersing the filter media composite 19 to a side of the fibrous support layer 18 to create a surface layer of the curable stiffening agent on the fibrous support layer 18. The curable stiffening agent can be applied to the fibrous support layer 18 after the fibrous support layer 18 is bonded to the filtration layer 20. The curable stiffening agent can be applied via transfer roll surface coating only on one side of the fibrous support layer 18, which is opposite an opposing side to which the filtration layer 20 is bonded. With this arrangement, the curable stiffening agent can be spaced from the interface of the filtration layer 20 and the fibrous support layer 18, and may form no part of any bonding between the filtration layer 20 and the fibrous support layer 18. As examples, the curable stiffening agent includes at least one of a phenolic resin, a modified epoxy, and a thermoset polymer.

The filter media composite 19 is pleated to form a plurality of pleats 36. The curable stiffening agent is cured to retain the filter media composite 19 in a form of the plurality of pleats 36. The filter media composite 19 (containing the fibrous support layer 18, shown in FIGS. 8A-B) should be partially hardened in order to form the pleats 36. However, over-hardening is less desired, as this would impede pliability and processing for pleat formation. In the present embodiment, the step of curing includes a first stage of curing (shown as the heating chamber 60 of FIG. 8A) before pleating to partially cure and stiffen the filter media composite 19.

A first stage of curing includes heating the filter media composite 19 to a temperature of between 200° and 400° Fahrenheit for a duration of between 1.0 to 5.0 minutes. As depicted in FIG. 8B, the filter media composite 19 then enters a pleater 64 to be pleated. Once pleating has taken place, a second stage of curing in a subsequent heater, or oven 66, then occurs to set the pleats 36. The second stage of curing includes heating the filter media composite 19 to a temperature of between 200° and 400° Fahrenheit for a duration of between 3.0 to 4.0 minutes. The temperature of the second stage of curing may be greater than the temperature of the first stage of curing, for example by at least 20° Fahrenheit in some embodiments. Once the second stage of curing is complete, the pleated filter media composite 19 is considered fully cured and stiffened. Stiffness of the pleats 36 is measured by the Gurley Stiffness Test (TAPPI T543) in units of milligram-force, or the King Stiffness Test (ASTM D4032), in units of pound-force.

Once the pleated filter media composite 19 is complete, it may be used to form a filter such as a back-pulsed filter cartridge 12. The pleated filter media composite 19 is oriented circumferentially around a longitudinal axis to form a tubular ring 14. A support core 22, with a plurality of perforations, is placed circumferentially interior to the pleated filter media composite 19. The first end 26 of the tubular ring 14 of filter media composite 19 is capped (e.g. with potting sealant) with a top end pan to provide the open end cap 24. Similarly, the second end 32 of the tubular ring 14 is capped (e.g. with potting sealant) with a bottom end pan to provide the closed end cap 30. At least one strap 34 and typically several regularly spaced straps 34 can be placed circumferentially exterior to the pleated filtration media composite 19, spaced between the top end pan and the bottom end pan to provide restraint for the pleated filter media composite 19 for back-pulse support.

Figure 9:
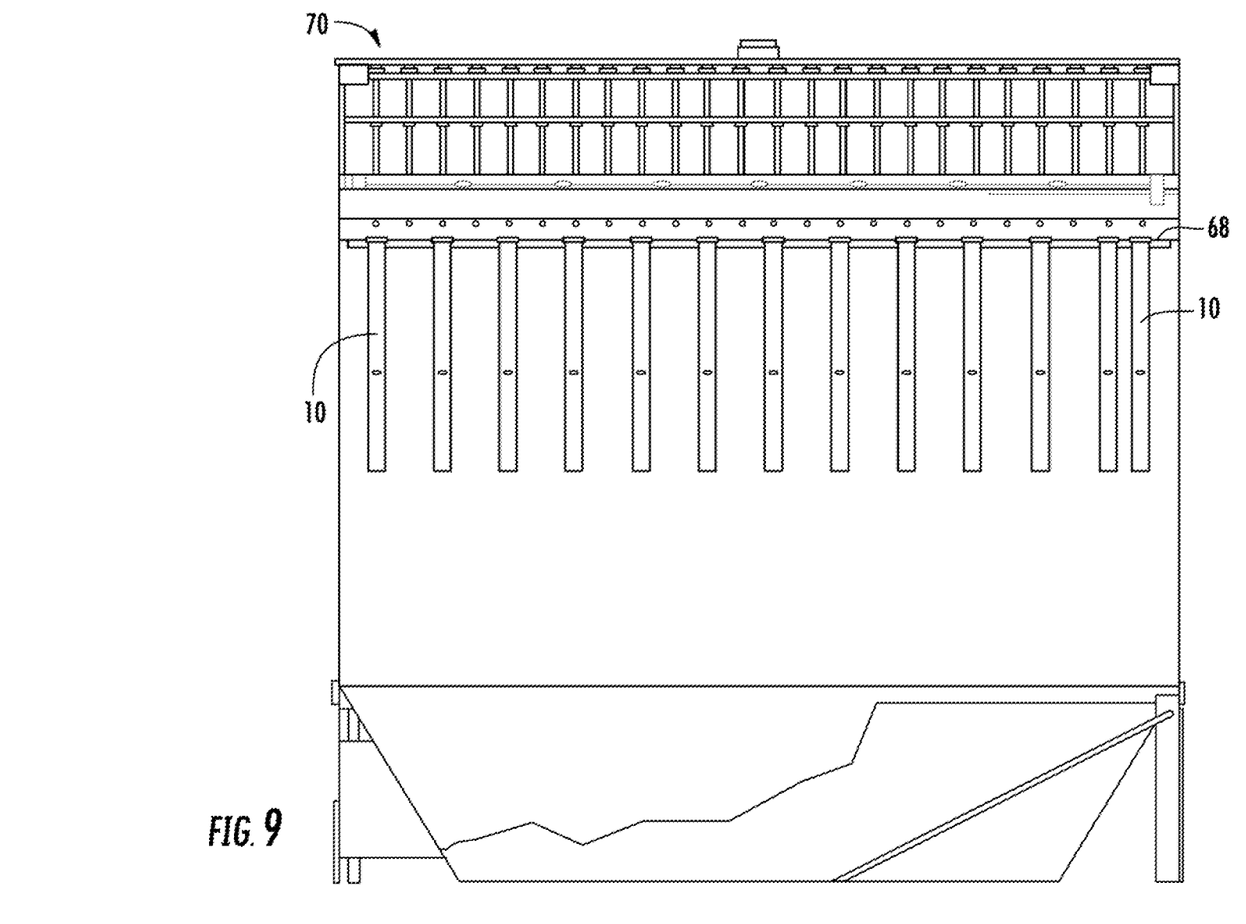
FIG. 9 is a side view of a plurality of pleated filter elements as used in a pulse jet baghouse, according to a first illustrated embodiment of the invention.
Figure 10:
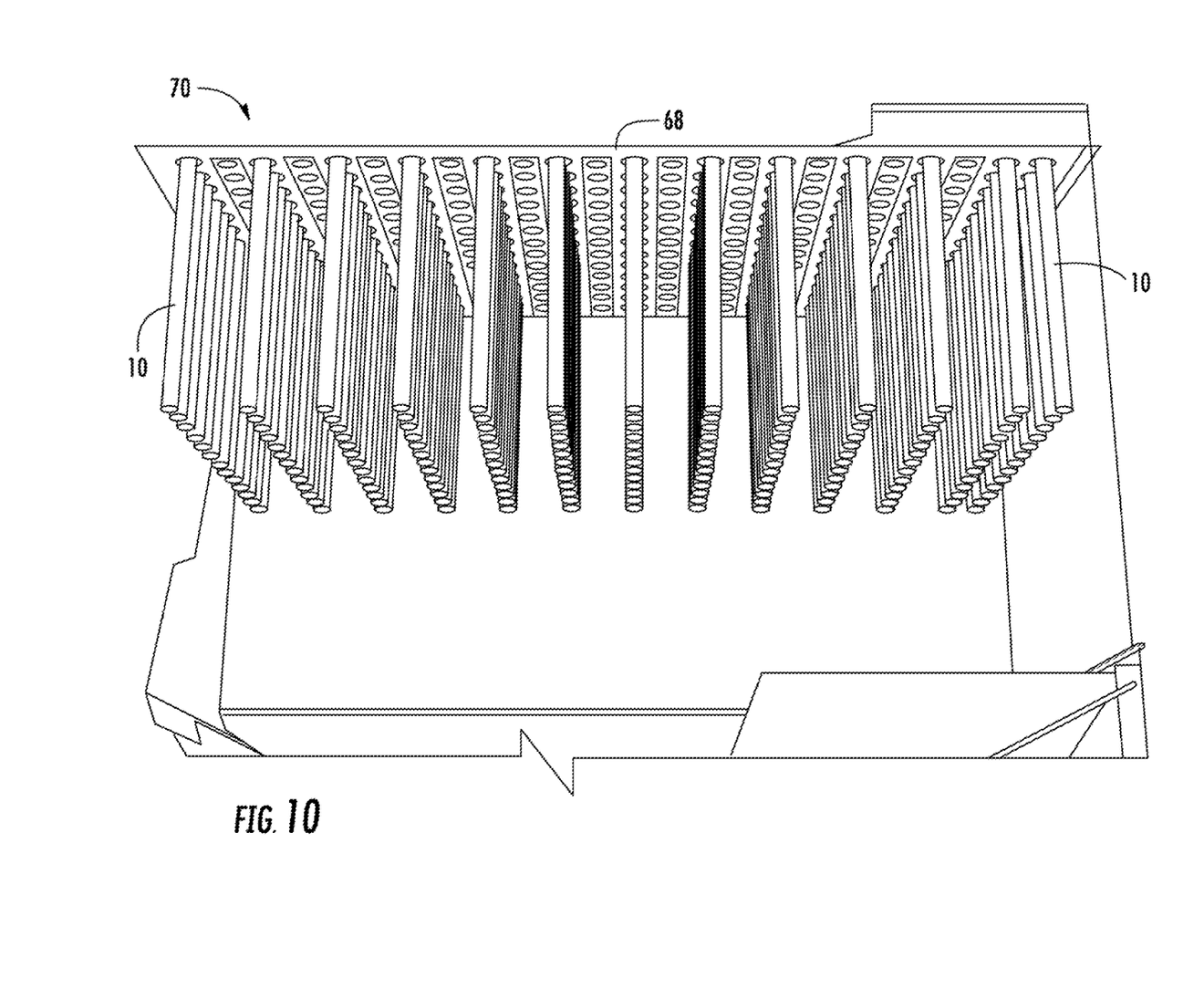
FIG. 10 is a bottom perspective view of the plurality of pleated filter elements in the baghouse of FIG. 9.
Figure 11:
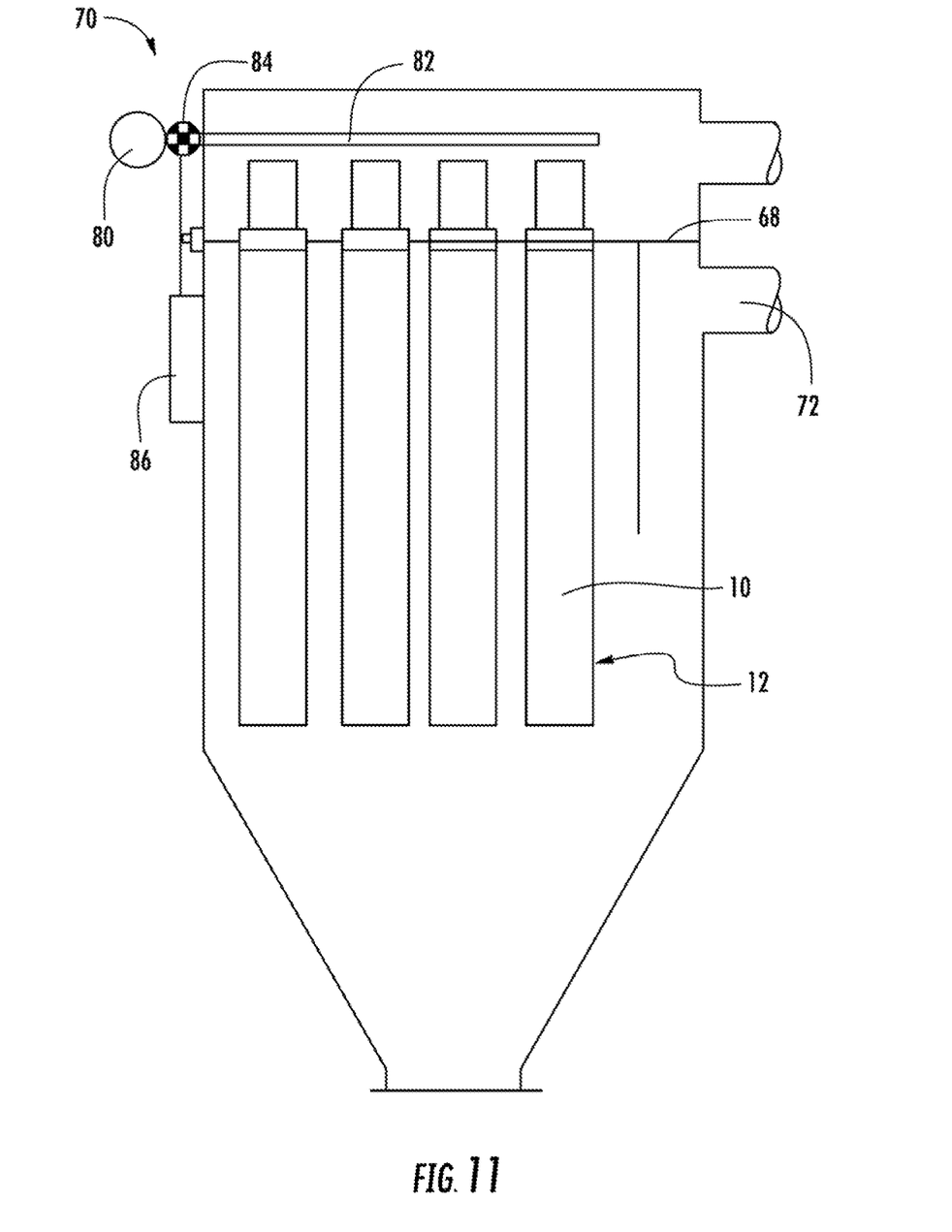
FIG. 11 is a schematic illustration of a pulse jet baghouse with a plurality of pleated filter elements installed.

Referring to FIGS. 9-11, exemplary filter house applications and a method of using the filter cartridges 12 including the pleated filter element 10 are illustrated. The filter cartridges 12 are installed into a tube sheet 68 of a filter house 70, for instance a reverse pulse filter house. The filter cartridges 12 can be sealed thereto, as shown for example schematically in FIGS. 5A-B and as discussed above, or sealed in other manners known for tube sheet applications. For a high temperature application, such as a cement kiln application, the pleated filter element 10 can be continuously operated for at least several hours at an elevated temperature of at least 500° Fahrenheit to remove particulates from an air stream passing through the pleated filter element 10 from an unfiltered air inlet 72 to a filtered air outlet 74. The filter cartridge 12 along with its pleated filter element 10 in this application is periodically reverse pulsed to dislodge filter cake collected on the pleated filter element 10. For example, as shown schematically in FIG. 11, the filter house 70 includes a compressed air source 80 that is connected to a back-pulse compressed air manifold 82 via a solenoid valve 84. A controller 86 at timed intervals or when sensing pressure differentials indicating dust cake loads will periodically open the solenoid valve 84 to create a jet pulse of air through the manifold 82 that back pulses air through the filter cartridges 12 to dislodge accumulated filter cake upon the pleated filter elements 10.

When installed in a filter house 70, for instance a typical pulse jet baghouse, the filter cartridge 12 is in in parallel circuit with other similar filter cartridges 12 along a tube sheet 68 that divides the filter housing into a clean chamber and a dirty chamber. Unfiltered or dirty gas passes from the inlet 72 through the pleated filter elements 10 of the filter cartridges 12, removing particulates. This in turn creates filtered air that passes into the clean chamber that can exit the house 70 through the outlet 74. Periodically a pulse jet system will pulse air to remove "filter cake" from the pleated filter elements 10 to be collected at the bottom of the filter house 70 and therefore regenerate the lifespan of the pleated filter elements 10 of the filter cartridges 12. The filter cartridges 12 are particularly useful in elevated temperature applications such as cement kiln filtration applications, where operating temperatures are often above 500° Fahrenheit. This can occur for long periods of continuous operation over several hours, days and/or weeks.

Figure 12:
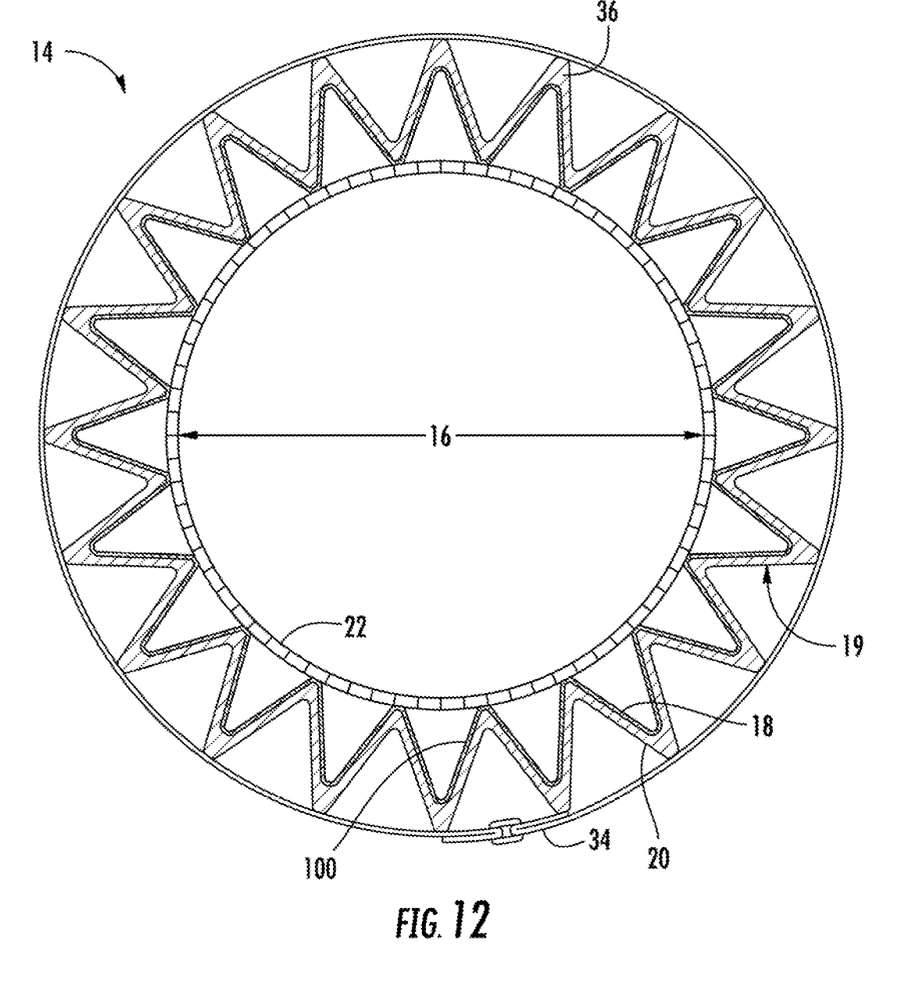
FIG. 12 is a horizontal cross-sectional view of the pleated filter element similar to that shown in FIG. 3, but according to a further embodiment where a co-pleated layer of metal screen in incorporated to provide additional pleat support.
Figure 13:
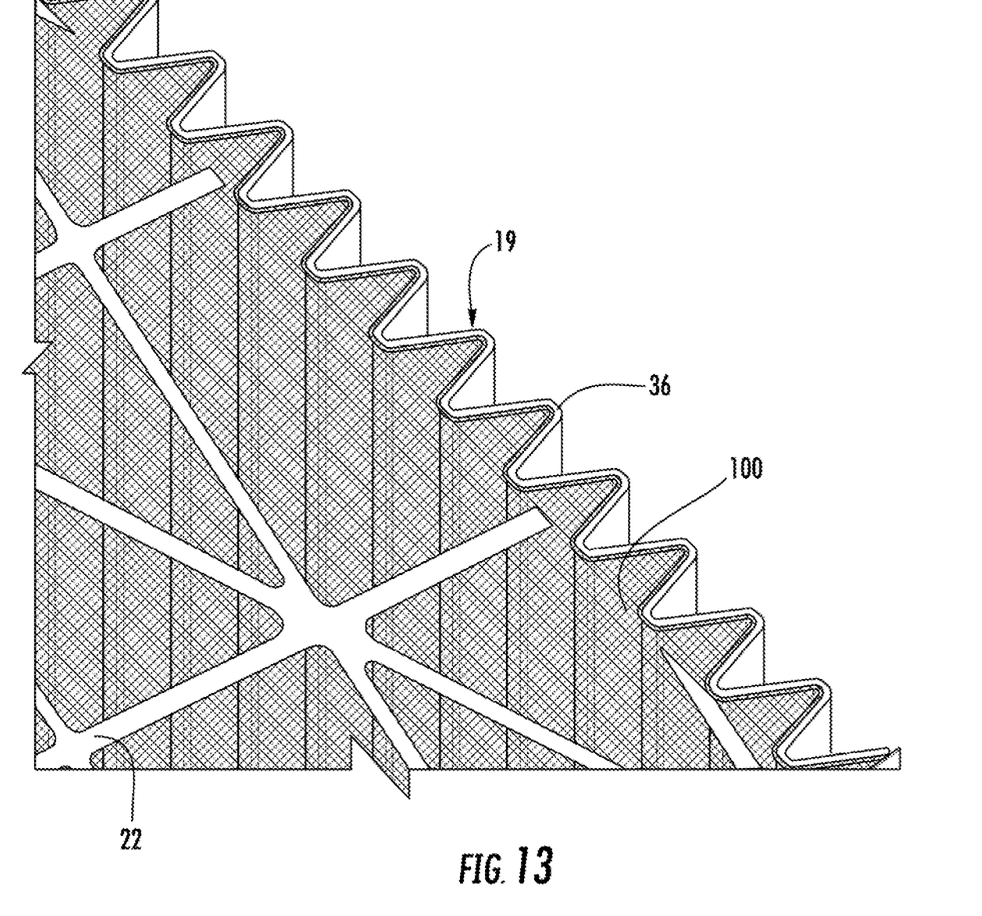
FIG. 13 is an enlarged perspective view of the pleated filter media composite similar to that of FIG. 7, but used in the pleated filter cartridge of FIG. 12, illustrating a plurality of pleats of a pleated composite including co-pleated metal screen include in the pleated filter element.
Figure 14:
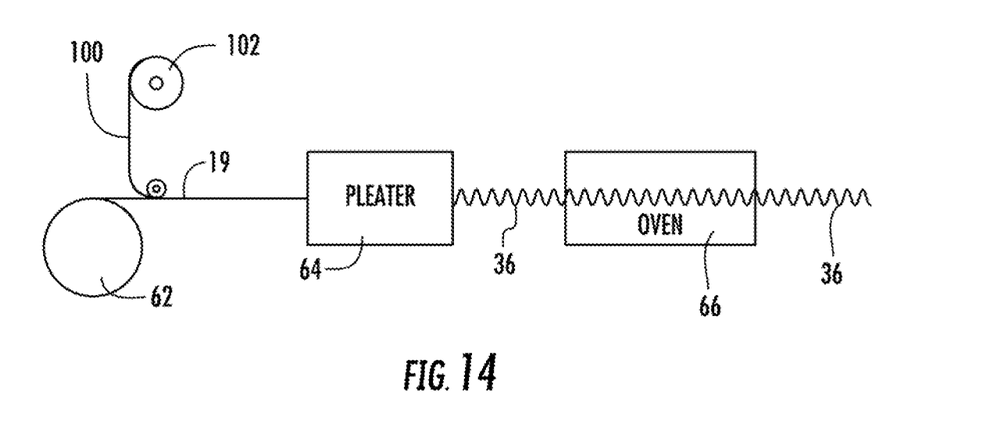
FIG. 14 is a schematic illustration of a pleating and further cure station apparatus similar to that of FIG. 8B but that provides a pleating process for pleating the filter media composite including a layer of metal screen to be copleated for use in the alternative embodiment of FIGS. 12-13.

Turning to FIGS. 12-14, a further embodiment is illustrated that is the same as that of the prior embodiments (such that the same reference numbers are used and the foregoing description is applicable), however this embodiment also includes a layer of metal screen 100 (e.g. such as expanded metal or other wire metal mesh) that is co-pleated with the fibrous support layer 18 and the filtration layer 20 and in the finished filter element is preferably along the cured surface coating 44 and the outlet side rather than the inlet side. This provides for additional support to maintain pleated if further support is needed. The metal screen 100 such as metal mesh has much larger pores than that of the filtration layer 100 and/or that of the fibrous support layer, such that the metal screen is for support rather than serving a filtering function.

For example, the filter element's flow characteristics largely remain the same with pressure drop remaining about the same with or without the metal screen (e.g. the metal screen does not appreciable affect air flow restriction in that any added air flow restriction may be less than 5% for the normal filtration operation when air flow is passing therethrough). While the metal screen 100 may take various forms, preferably the metal screen comprises one of more of the following characteristics: (a) woven wire mesh screen; (b) crimp style: preferably but not limited to lock or double crimp; (c) weave style: preferably but not limited to plain/double or twill square; (d) porosity and/or open area %: preferably but not limited to >=70%; and/or (e) MESH size: preferably but not limited to 20×20 MESH to 120×120 MESH.

Turning next to FIG. 14, when it is desired to also co-pleat metal screen 100, a roll 102 of metal screen 100 is arranged upstream of the pleater 64 to apply a layer of metal screen 100 onto the partially cured and partially stiffened filter media composite 19 (e.g. that can be stored on a filter media roll 62), which is then processed together by the pleater 64 that creates pleats 36 into the filter media composite 19 and the metal screen 100 as well. The partially cured stiffening agent is able to retain shape and memory of the pleats 36 at this stage, which is further set by the metal screen 100 co-pleated therewith. Thereafter, the partially cured filter media composite 19 along with the co-plated metal screen is subjected to a further curing via oven 66 that further cures and stiffens the filter media composite 19 and further sets the pleats 36 further.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter, comprising:
    a pleated filter element including a fibrous support layer;
    a filtration layer bonded to the fibrous support layer, the fibrous support layer and the filtration layer being in a pleated form to provide a plurality of pleats;
    a cured stiffening agent maintaining the fibrous support layer in a pleated form, wherein the fibrous support layer is bonded to the filtration layer by other than the cured stiffening agent; and
    wherein the cured stiffening agent comprises a surface coating applied to a first side of the fibrous support layer, and wherein the filtration layer is applied to a second side opposite the first side of the fibrous support layer.

2. The filter of claim 1, further comprising the following characteristics:
    wherein the fibrous support layer comprises a plurality of fibers of a material able to withstand an operating temperature of at least 500° Fahrenheit, the fibrous support layer having a basis weight of between 8 ounces/square yard to 25 ounces/square yard, with the fibers having an average width of at least 1.0 micron;
    wherein the fibrous support layer has a caliper thickness of between 0.127 mm and 1.27 mm;
    wherein the filtration layer is of a material able to withstand an operating temperature of at least 500° Fahrenheit, the filtration layer comprising at least one of (a) an expanded membrane comprising nodes and fibrils, wherein the fibrils have an average width not greater than 1 micron, and (b) a plurality of nanofibers having an average width not greater than 1 micron, the filtration layer having an initial filtration efficiency of at least 95.0% for 3.0 microns as measured by ASTM D6830-02/VDI 3962;
    wherein the filtration layer has a caliper thickness of between 0.005 mm to 0.015 mm; and
    wherein the cured stiffening agent provides added basis weight between 0.88 ounce/square yard to 4.4 ounces/square yard.

3. The filter of claim 1, wherein the cured stiffening agent comprises at least one of a phenolic resin, a modified epoxy, and a thermoset polymer.

4. The filter of claim 1, wherein the pleated filter element is integrated in a back-pulsed filter cartridge;
    wherein the pleated form defines a tubular ring defining a central cavity with the fibrous support layer along the central cavity and the filtration layer on a radially outboard surface thereof and including a support core supporting an inner periphery of the tubular ring along the central cavity, an open end cap attached to a first end of the tubular ring and a closed end cap attached to a second end of the tubular ring, and further comprising support straps in spaced locations between the closed end cap and the open end cap in surrounding supporting relation to the tubular ring and configured to provide restraint to support and prevent bursting of the pleats when backpulsing is applied.

5. The filter of claim 1, wherein the cured stiffening agent maintains pleat shape of the pleats without any pleated metal support.

6. The filter of claim 1, wherein the filtration layer is bonded to the fibrous support layer by controlled pressurized thermal mechanical interfacial layer bonding.

7. The filter of claim 1, further comprising a metal screen co-pleated with the fibrous support layer and the filtration layer.

8. The filter of claim 7, wherein the metal screen is in contact with: (a) an external side of the fibrous support layer, and (b) the cured stiffened agent.

9. A method for making the filter of claim 1, comprising:
    providing a filter media composite including the fibrous support layer bonded to the filtration layer;
    applying the curable stiffening agent without immersing the filter media composite to a side of the fibrous support to create a surface layer of the curable stiffening agent on the fibrous support layer;
    pleating the filter media composite to form the plurality of pleats; and
    curing the curable stiffening agent to retain the filter media composite in a form of the plurality of pleats.

10. The method of claim 9, wherein the curing comprises a first stage of curing before pleating to partially cure and stiffen the filter media composite, and a second stage of curing after pleating to set the pleats.

11. The method of claim 10, wherein the first stage of curing comprises heating the filter media composite to a temperature of between 200° and 400° Fahrenheit for a duration of between 1.0 minutes to 5.0 minutes, and the second stage of curing comprises heating the filter media composite to a temperature of between 200° and 400° Fahrenheit for a duration of between 3.0 minutes to 4.0 minutes.

12. The method of claim 11 wherein the temperature of the second stage of curing is greater than the first stage of curing by at least 20° Fahrenheit.

13. The method of claim 9, wherein the curable stiffening agent is applied to the fibrous support layer after the fibrous support layer is bonded to the filtration layer, and applied only on a side which is opposite an opposing side to which the filtration layer is bonded.

14. The method of claim 9, further comprising bonding the filtration layer to the fibrous support layer by controlled pressurized thermal mechanical interfacial layer bonding, and wherein the curable stiffening agent forms no part of any bonding between the filtration layer and the fibrous support layer.

15. The method of claim 9, wherein the step of applying the curable stiffening agent comprises surface coating using a pick-up and transfer roll that contacts only one side of the fibrous support layer.

16. The method of claim 9, further comprising the steps of:
    a. orienting the pleated filter media composite circumferentially around a longitudinal axis, with the fibrous support layer facing inwards, to form a first end and a second end;
    b. placing a core, having a plurality of perforations, circumferentially interior to the pleated filter media composite;

c. capping the first end with a top end pan, and the second end with a bottom end pan; and d. placing at least one strap circumferentially exterior to the pleated filtration media composite spaced between the top end pan and the bottom end pan to provide restraint for the pleated filter media composite for backpulse support.

17. The method of claim 9, wherein the fibrous support layer comprises at least one of a woven fiberglass layer and/or a non-woven fiberglass layer, a woven PTFE felt, and a polymer needle felt comprising a polymer that is able to withstand an operating temperature of at least 500° Fahrenheit, and the filtration layer comprises at least one of an EPTFE membrane and a nanofiber layer.

18. The method of claim 9, wherein the fibrous support layer comprises a woven fiberglass layer, the filtration layer comprises an EPTFE membrane, and the curable stiffening agent comprises a phenolic resin.

19. The method of claim 9, wherein the curable stiffening agent comprises at least one of a phenolic resin, a modified epoxy, and a thermoset polymer.

20. The method of claim 9 further comprising co-pleating a metal screen with the filter media composite.

21. A filter, comprising:
a pleated filter element including a fibrous support layer;
a filtration layer bonded to the fibrous support layer, the fibrous support layer and the filtration layer being in a pleated form to provide a plurality of pleats;
a cured stiffening agent maintaining the fibrous support layer in a pleated form, wherein the fibrous support layer is bonded to the filtration layer by other than the cured stiffening agent; and
wherein the fibrous support layer comprises at least one of a woven fiberglass layer and/or a non-woven fiberglass layer, a woven PTFE felt, and a polymer needle felt comprising a polymer that is able to withstand an operating temperature of at least 500° Fahrenheit, and the filtration layer comprises at least one of an EPTFE membrane and a nanofiber layer.

22. A filter, comprising:
a pleated filter element including a fibrous support layer;
a filtration layer bonded to the fibrous support layer, the fibrous support layer and the filtration layer being in a pleated form to provide a plurality of pleats;
a cured stiffening agent maintaining the fibrous support layer in a pleated form, wherein the fibrous support layer is bonded to the filtration layer by other than the cured stiffening agent; and
wherein the fibrous support layer comprises a woven fiberglass layer, the filtration layer comprises an EPTFE membrane, and the cured stiffening agent comprises a phenolic resin.

23. A filter, comprising:
a pleated filter element including a fibrous support layer;
a filtration layer bonded to the fibrous support layer, the fibrous support layer and the filtration layer being in a pleated form to provide a plurality of pleats;
a cured stiffening agent maintaining the fibrous support layer in a pleated form, wherein the fibrous support layer is bonded to the filtration layer by other than the cured stiffening agent; and
wherein the cured stiffening agent penetrates a partial depth of the fibrous support layer at an average depth of between 5% to 80% of a thickness of the fibrous support layer.

24. A filter, comprising:
a pleated filter element including a fibrous support layer;
a filtration layer bonded to the fibrous support layer, the fibrous support layer and the filtration layer being in a pleated form to provide a plurality of pleats;
a cured stiffening agent maintaining the fibrous support layer in a pleated form, wherein the fibrous support layer is bonded to the filtration layer by other than the cured stiffening agent; and
wherein the fibrous support layer comprises a stiffened region having the cured stiffening agent, and a free region that is free of the cured stiffening agent;
wherein the free region is interposed between the stiffened region and the filtration layer.

25. A method of using a filter, comprising:
a pleated filter element including a fibrous support layer;
a filtration layer bonded to the fibrous support layer, the fibrous support layer and the filtration layer being in a pleated form to provide a plurality of pleats;
a cured stiffening agent maintaining the fibrous support layer in a pleated form, wherein the fibrous support layer is bonded to the filtration layer by other than the cured stiffening agent, comprising:
installing the filter into a tube sheet of a pulse filter house;
operating the filter continuously over at least several hours at an elevated temperature of at least 500° Fahrenheit to remove particulates from an air stream passing through the pleated filter element; and
periodically pulsing the pleated filter element to dislodge filter cake collected on the pleated filter element.

* * * * *